(12) United States Patent
Nguyen-Huu et al.

(10) Patent No.: US 10,797,870 B1
(45) Date of Patent: Oct. 6, 2020

(54) SYSTEMS AND METHODS FOR GENERATING PASSWORDS

(71) Applicant: Symantec Corporation, Mountain View, CA (US)

(72) Inventors: Duong Nguyen-Huu, Los Angeles, CA (US); Bruce McCorkendale, Manhattan Beach, CA (US)

(73) Assignee: NortonLifeLock Inc., Tempe, AZ (US)

( * ) Notice: Subject to any disclaimer, the term of this patent is extended or adjusted under 35 U.S.C. 154(b) by 182 days.

(21) Appl. No.: 16/000,920

(22) Filed: Jun. 6, 2018

(51) Int. Cl.
| | |
|---|---|
| *H04L 9/08* | (2006.01) |
| *H04L 29/06* | (2006.01) |
| *H04L 29/08* | (2006.01) |
| *G06F 21/46* | (2013.01) |
| *G06F 16/9038* | (2019.01) |

(52) U.S. Cl.
CPC ........ *H04L 9/0861* (2013.01); *G06F 16/9038* (2019.01); *G06F 21/46* (2013.01); *H04L 63/083* (2013.01); *H04L 67/306* (2013.01)

(58) Field of Classification Search
CPC ... H04L 9/0861; H04L 63/083; H04L 67/306; G06F 16/9038; G06F 21/46
See application file for complete search history.

(56) References Cited

U.S. PATENT DOCUMENTS

| | | | | |
|---|---|---|---|---|
| 8,332,918 B2 * | 12/2012 | Vedula | ..................... | G06F 21/46 713/182 |
| 8,689,001 B1 * | 4/2014 | Satish | ..................... | G06F 21/46 713/182 |
| 9,218,481 B2 * | 12/2015 | Belisario | .................. | G06F 21/46 |
| 10,325,091 B2 * | 6/2019 | Shapiro | ..................... | G06F 21/31 |
| 10,546,116 B2 * | 1/2020 | Sahin | ....................... | G06F 21/46 |
| 2008/0263175 A1 * | 10/2008 | Naono | ..................... | H04L 67/04 709/217 |
| 2011/0083172 A1 * | 4/2011 | Heim | ....................... | G06F 21/46 726/6 |
| 2012/0110668 A1 * | 5/2012 | Schechter | ............... | G06F 21/00 726/25 |
| 2014/0068731 A1 * | 3/2014 | Belisario | .................. | G06F 21/46 726/6 |

(Continued)

OTHER PUBLICATIONS http://archive.geekwisdom.com/dyn/passwdmeter.html.

(Continued)

*Primary Examiner* — Joseph P Hirl
*Assistant Examiner* — Thomas A Gyorfi
(74) *Attorney, Agent, or Firm* — FisherBroyles LLP

(57) ABSTRACT

The disclosed computer-implemented method for generating passwords may include (i) accessing a vault of confidential information describing a user, (ii) extracting, from the vault, a set of multiple items of confidential information describing the user, (iii) executing a programmed heuristic on the set of multiple items of confidential information to generate multiple candidate passwords that each derives from a respective semirandom permutation of the multiple items of confidential information, and (iv) displaying electronically the multiple candidate passwords to the user to enable the user to select a password from the multiple candidate passwords as a specific password for accessing a protected computing resource. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2015/0379274 A1* | 12/2015 | Nguyen-Huu | ......... | G06F 21/46 726/30 |
| 2016/0148332 A1* | 5/2016 | Stibel | ................ | G06Q 20/4016 705/44 |
| 2017/0323398 A1* | 11/2017 | Dintenfass | ............ | G06Q 40/06 |
| 2018/0060564 A1* | 3/2018 | Shapiro | .................. | G06F 21/31 |

OTHER PUBLICATIONS https://blogs.dropbox.com/tech/2012/04/zxcvbn-realistic-password-strength-estimation/.
https://www.fourmilab.ch/javascrypt/pass_phrase.html.
https://www.rempe.us/diceware/#eff.

\* cited by examiner

SYSTEMS AND METHODS FOR GENERATING PASSWORDS

BACKGROUND

Passwords are the center of authentication services. Passwords created from information available in public records, social media posts, search engines, etc. are extremely vulnerable to cracking. For example, attackers may scan or search one or more of these publicly available repositories to extract items of information on which these passwords are based. The attackers may then use one or more of these extracted items of information from these public repositories to execute attacks that attempt to crack user passwords.

In view of the above, it would be desirable to create passwords that are strong in terms of password strength, while simultaneously being relatively easy for a user to remember, and also while simultaneously being difficult for an attacker to compromise using public sources. The instant disclosure, therefore, identifies and addresses a need for improved systems and methods for generating passwords.

SUMMARY

As will be described in greater detail below, the instant disclosure describes various systems and methods for generating passwords. In one example, a computer-implemented method for generating passwords may include (i) accessing a vault of confidential information describing a user, (ii) extracting, from the vault, a set of multiple items of confidential information describing the user, (iii) executing a programmed heuristic on the set of multiple items of confidential information to generate multiple candidate passwords that each derives from a respective semirandom permutation of the multiple items of confidential information, and (iv) displaying electronically the multiple candidate passwords to the user to enable the user to select a password from the multiple candidate passwords as a specific password for accessing a protected computing resource.

In some examples, deriving the multiple candidate passwords from the respective semirandom permutation of the multiple items of confidential information describing the user increases a memorability of the multiple candidate passwords in comparison to candidate passwords that do not describe the user. In some examples, basing the multiple candidate passwords on confidential information rather than public information increases a strength of the selected specific password.

In some examples, accessing the vault of confidential information describing the user is performed in response to the user granting access to the vault of confidential information. In one embodiment, the vault of confidential information is maintained by an identity theft protection service.

In some examples, executing the programmed heuristic on the set of multiple items of confidential information to generate multiple candidate passwords may include testing items in an initial larger set of multiple candidate passwords for password strength. In some examples, the computer-implemented method may further include filtering a subset of the initial larger set of multiple candidate passwords from the initial larger set of multiple candidate passwords based on the subset failing the test for password strength.

In some examples, executing the programmed heuristic on the set of multiple items of confidential information may include checking whether each item in the set of multiple items of confidential information has been publicly revealed. In some examples, the computer-implemented method may further include filtering a subset of the multiple items of confidential information from the multiple items of confidential information based on a determination that the subset has been publicly revealed. In one embodiment, the method may also further include performing a security action to protect the protected computing resource based on the selected specific password.

In one embodiment, a system for implementing the above-described method may include (i) an accessing module, stored in memory, that accesses a vault of confidential information describing a user, (ii) an extraction module, stored in memory, that extracts, from the vault, a set of multiple items of confidential information describing the user, (iii) an execution module, stored in memory, that executes a programmed heuristic on the set of multiple items of confidential information to generate multiple candidate passwords that each derives from a respective semirandom permutation of the multiple items of confidential information, (iv) a displaying module, stored in memory, that displays electronically the multiple candidate passwords to the user to enable the user to select a password from the multiple candidate passwords as a specific password for accessing a protected computing resource, and (v) at least one physical processor configured to execute the accessing module, the extraction module, the execution module, and the displaying module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) access a vault of confidential information describing a user, (ii) extract, from the vault, a set of multiple items of confidential information describing the user, (iii) execute a programmed heuristic on the set of multiple items of confidential information to generate multiple candidate passwords that each derives from a respective semirandom permutation of the multiple items of confidential information, and (iv) display electronically the multiple candidate passwords to the user to enable the user to select a password from the multiple candidate passwords as a specific password for accessing a protected computing resource.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
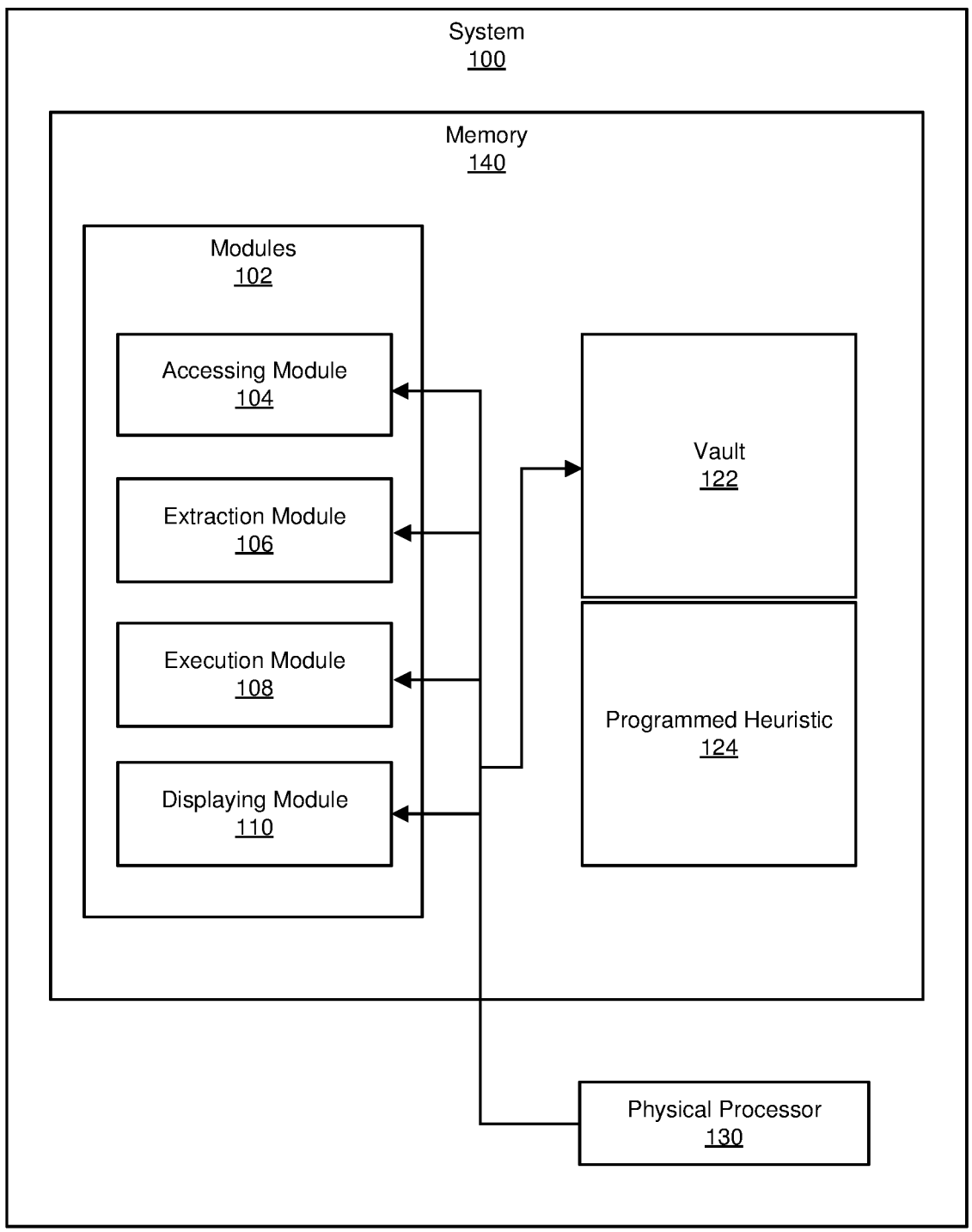
FIG. 1 is a block diagram of an example system for generating passwords.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for generating passwords. The disclosed subject matter may improve upon related password generation systems by generating passwords that are both relatively easy to remember while simultaneously being difficult to crack due to the passwords being based on, or derived from, confidential information rather than being based on information that is merely random or publicly accessible. Accordingly, the disclosed subject matter may enable a user to select a password that has a high level of memorability while also providing a level of safety or assurance to the user that the password will not be cracked by an attacker scanning or searching public repositories of information, as discussed further below.

Figure 2:
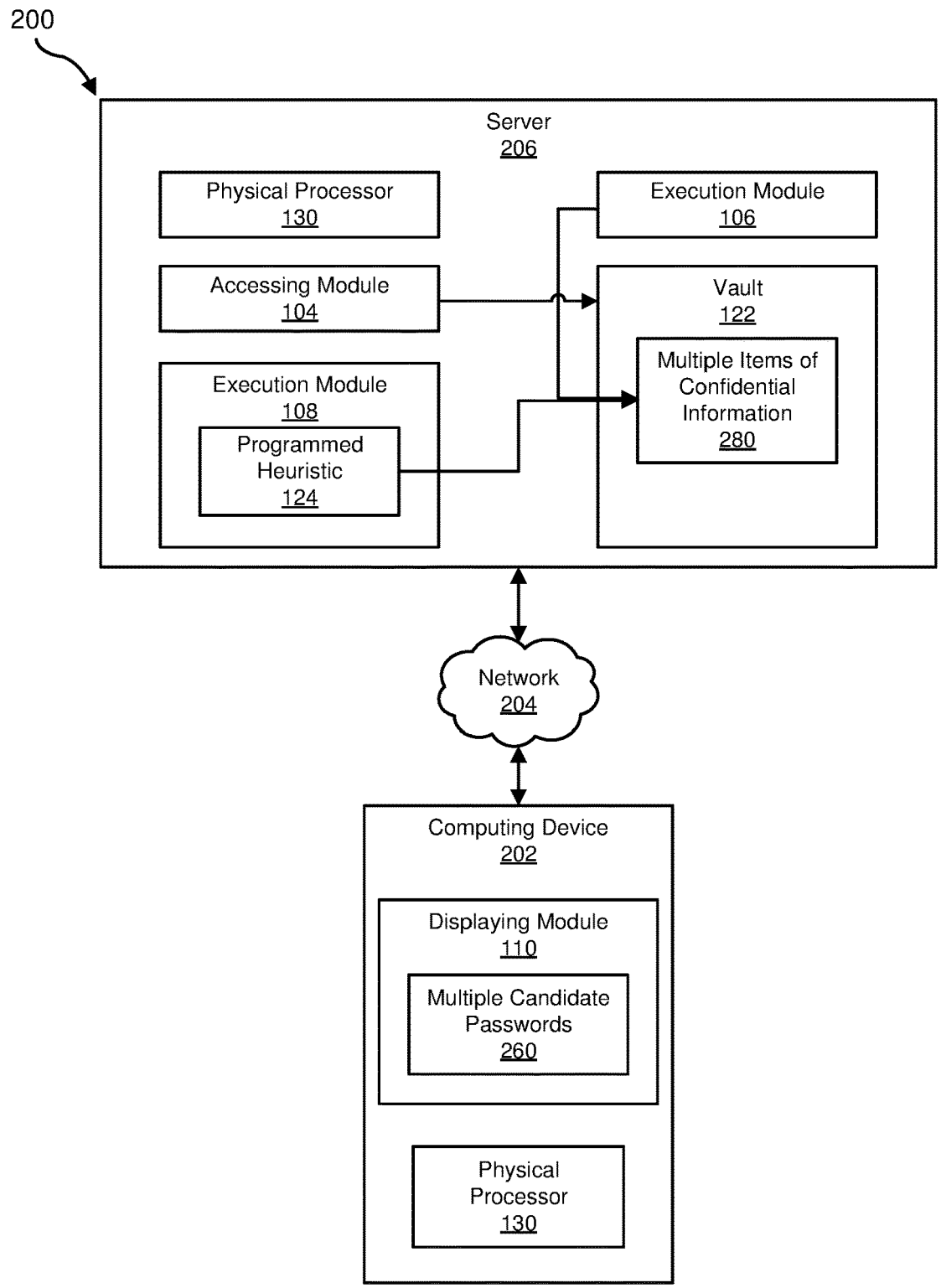
FIG. 2 is a block diagram of an additional example system for generating passwords.

The following will provide, with reference to FIGS. 1-2, detailed descriptions of example systems for generating passwords. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of example system 100 for generating passwords. As illustrated in this figure, example system 100 may include one or more modules 102 for performing one or more tasks. For example, and as will be explained in greater detail below, example system 100 may include an accessing module 104 that accesses a vault, such as a vault 122, of confidential information describing a user. Example system 100 may additionally include an extraction module 106 that extracts, from the vault, a set of multiple items of confidential information describing the user. Example system 100 may also include an execution module 108 that executes a programmed heuristic, such as a programmed heuristic 124, on the set of multiple items of confidential information to generate multiple candidate passwords that each derives from a respective semirandom permutation of the multiple items of confidential information. Example system 100 may additionally include a displaying module 110 that displays electronically the multiple candidate passwords to enable the user to select a password from the multiple candidate passwords as a specific password for accessing a protected computing resource. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate generating passwords. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to generate passwords.

For example, and as will be described in greater detail below, accessing module 104 may access vault 122 of confidential information describing a user. Extraction module 106 may extract, from vault 122, a set of multiple items of confidential information 280 describing the user. Execution module 108 may execute programmed heuristic 124 on the set of multiple items of confidential information to generate multiple candidate passwords 260 that each derives from a respective semirandom permutation of multiple items of confidential information 280. Displaying module 110 may display electronically multiple candidate passwords 260 to the user to enable the user to select a password from multiple candidate passwords 260 as a specific password for accessing a protected computing resource.

Computing device 202 generally represents any type or form of computing device capable of reading computer-executable instructions. In one illustrative example, computing device 202 may correspond to a laptop or desktop that a corporate enterprise organization provides to an employee for work purposes. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of performing method 300 or capable of facilitating the performance of method 300. In one illustrative example, server 206 may correspond to a backend security server of a security vendor, such as SYMANTEC. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
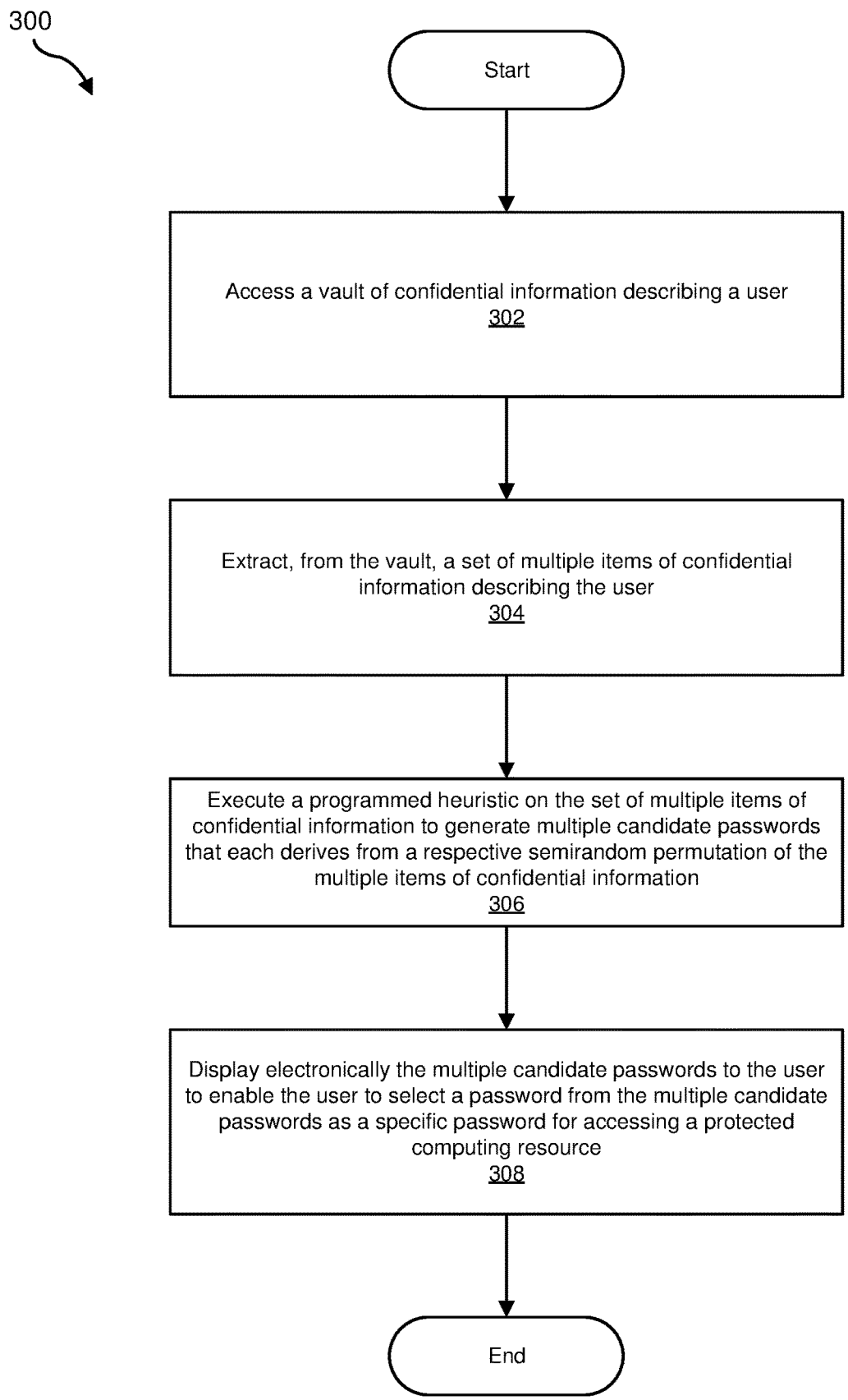
FIG. 3 is a flow diagram of an example method for generating passwords.

FIG. 3 is a flow diagram of an example computer-implemented method 300 for generating passwords. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may access a vault of confidential information describing a user. For example, accessing module 104 may, as part of server 206 in FIG. 2, access vault 122 of confidential information describing a user.

As used herein, the term "vault" generally refers to any container that provides a level of security or protection for the contents of the container. In some examples, the vault may be based in hardware, firmware, virtual resources, and/or software. Furthermore, as used herein, the term "confidential information" generally refers to information that has a level of confidentiality such that the information is not publicly accessible. Illustrative examples of confidential information may include (i) an identifier for an insurance company that provides insurance for the user, (ii) an identifier of a bank with which the user has a banking account, (iii) a portion of a Social Security number for the user, (iv) a portion of a driver license for the user, (v) an identifier of a hometown for the user, (vi) an identifier of a relative of the user, (vii) an office address for an employer of the user, (viii) an identifier of the employer of the user, (ix) an identifier of an occupation of the user, and (x) an identifier of an academic institution from which the user has graduated. One or more of these illustrative examples of confidential information are described in more detail below in connection with FIG. 4.

Accessing module 104 may access the vault of confidential information in a variety of ways. In some examples, accessing module 104 may access the vault of confidential information in response to the user granting access to the vault. For example, the user may initiate a password generation method corresponding to method 300. In response to the user initiating the password generation method, a corresponding module of system 100, such as accessing module 104, may request access to one or more vaults of confidential information. In response, the user may grant access to the one or more vaults of confidential information to enable accessing module 104 to access one or more items of confidential information that are stored within the vaults. In some examples, accessing module 104 may interact with the vaults of confidential information through an application programming interface.

In some examples, the vault of confidential information may be maintained by an identity theft protection service. One illustrative example of an identity theft protection service may include LIFELOCK. Other illustrative examples of identity theft protection services may include IDENTITYFORCE and IDENTITY GUARD. In other examples, the vault of confidential information may include any other suitable vault or repository that provides a level of protection or security for multiple items of underlying confidential information.

At step 304, one or more of the systems described herein may extract, from the vault, a set of multiple items of confidential information describing the user. For example, extraction module 106 may, as part of server 206 in FIG. 2, extract, from vault 122, a set of multiple items of confidential information 280 describing the user.

As used herein, the term "confidential information describing the user" generally refers to information that either directly or indirectly describes one or more attributes relating to the user. Extraction module 106 may extract multiple items of confidential information from the vault in a variety of ways.

As further described above, in one example extraction module 106 may extract items of confidential information from the vault by interacting with the vault through an application programming interface. For example, the vault may provide an application programming interface that provides a number of functions or services to clients who interact with the application programming interface. In order to obtain a result from a function or service provided by the application programming interface, a user or corresponding program may first require authorization. For example, the application programming interface may require the user or corresponding program to demonstrate possession of one or more credentials to authenticate as the user. Upon successfully demonstrating possession of one or more of these credentials, such as a password, the application programming interface may provide the user or corresponding program with access to one or more functions or services that return items of output information in response to items of input information. For example, an unauthenticated user may execute a command to list, output, enumerate, display, and/or share a multitude of items of confidential information stored within the vault. In some examples, extraction module 106 may extract the items of confidential information at least in part by populating a data structure, such as a list, with the items of confidential information after they are extracted from the vault.

At step 306, one or more of the systems described herein may execute a programmed heuristic on the set of multiple items of confidential information to generate multiple candidate passwords that each derives from a respective semirandom permutation of the multiple items of confidential information. For example, execution module 108 may, as part of server 206 in FIG. 2, execute programmed heuristic 124 on the set of multiple items of confidential information 280 to generate multiple candidate passwords 260 that each derives from a respective semirandom permutation of the multiple items of confidential information.

As used herein, the term "candidate passwords" generally refers to passwords that have been generated as candidates for a user to potentially select as an actual password to protect an underlying computing resource. For example, in order to protect one computing resource, the corresponding security system, such as system 100, may request that the user establishes an actual password to protect that specific computing resource. In these examples, the user may select the actual password and designate the actual password as the specific password that the user, or other individual, must input in order to access the computing resource. Moreover, in these examples, the user may select the actual password from a multitude of different candidate passwords. Furthermore, as used herein, the term "semirandom permutation" generally refers to a permutation that demonstrates, or appears to have, an element of randomness without being absolutely random. In one specific example, the three instances of multiple candidate passwords 260 shown in FIG. 4 indicate semirandom permutations of the specific instances of multiple items of confidential information 280 that are further shown in that figure, as further discussed below. Moreover, as used herein, the term "permutation of multiple items of confidential information" generally refers to any symbol or character string that is generated based on two or more underlying items of confidential information, whether through string addition, string subtraction, or other string manipulation.

Figure 4:
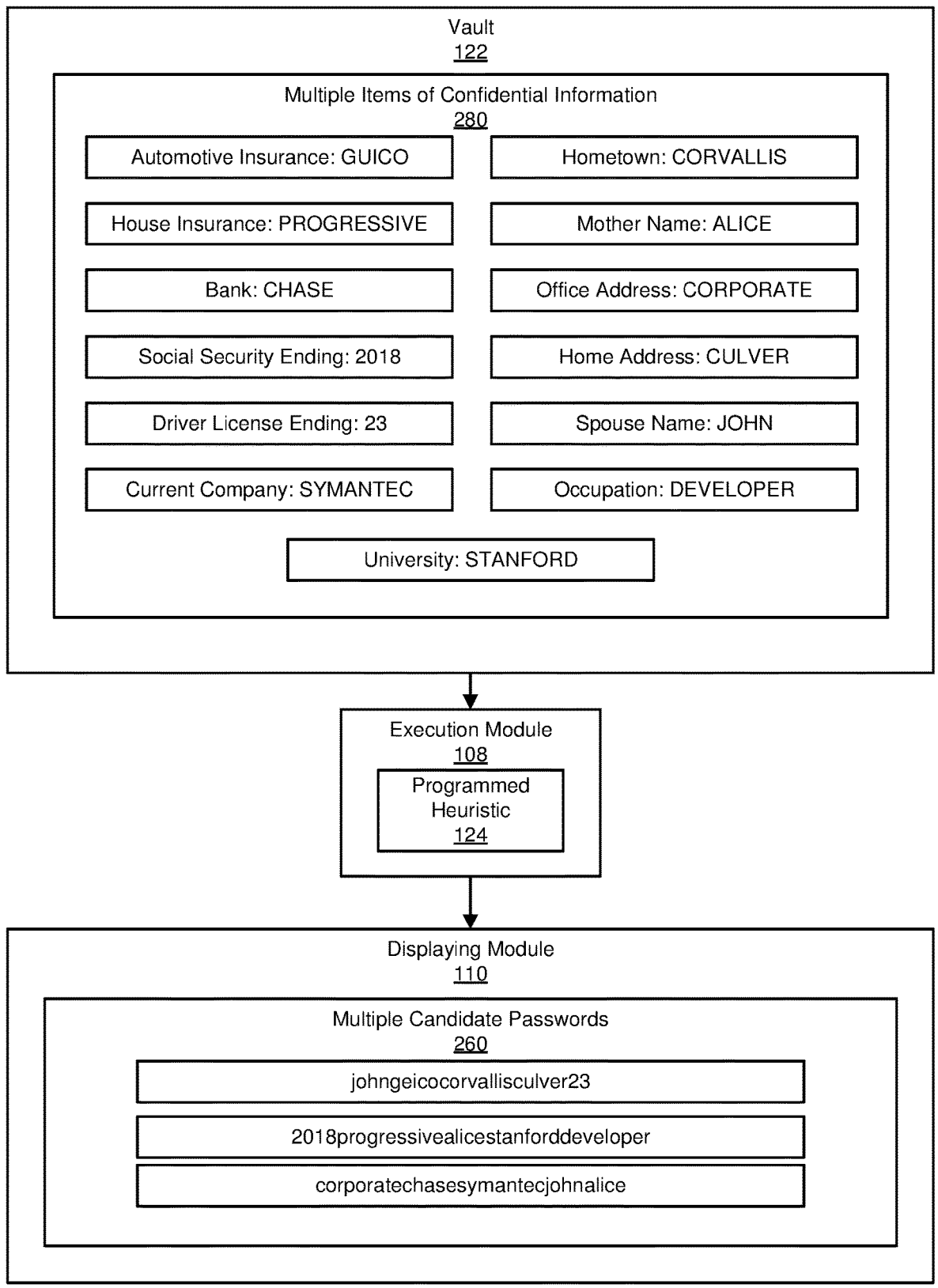
FIG. 4 is a block diagram of an example workflow corresponding to the method for generating passwords.

Execution module 108 may execute programmed heuristic 124 on the set of multiple items of confidential information 280 in a variety of ways. FIG. 4 shows an illustrative example of multiple items of confidential information 280. As further illustrated in this figure, these items of confidential information may include an identifier of automotive insurance ("GUICO"), an identifier of house insurance ("PROGRESSIVE"), an identifier of a bank ("CHASE"), an identifier of an ending of a Social Security number ("2018"), and ending of a driver license number ("23"), an identifier of a current company that employs the user ("SYMANTEC"), an identifier of a hometown where the user was raised or from where the user originates ("CORVALLIS"), an identifier of the user's mother ("ALICE"), a portion of an address for the office where the user works (e.g., "OFFICE"), an identifier of a home address where the user resides ("CULVER"), an identifier of a spouse of the user ("JOHN"), an identifier of an occupation in which the user is employed ("DEVELOPER"), and an identifier of a university from which the user graduated ("STANFORD"). These examples of items of confidential information are merely illustrative. In other examples, execution module 108 may reference a smaller subset or permutation of these fields of confidential information, or may reference a larger set or permutation of these fields of confidential information in combination with other fields of confidential information. Execution module 108 may reference any suitable one or more items of confidential information on which one or more candidate passwords may be generated in accordance with method 300.

Execution module 108 may apply the programmed heuristic on the multiple items of confidential information 280 in a variety of ways. In the illustrative example of FIG. 4, execution module 108 may apply a programmed heuristic that generates at least three different semirandom permutations of multiple items of confidential information 280. This figure further illustrates that these three instances of different semirandom permutations of multiple items of confidential information 280 may include the following: "johngeicocorvallisculver23," "2018progressivealicestanforddeveloper," and "corporatechasesymantecjohnalice." In this illustrative example, each of the semirandom permutations of multiple items of confidential information 280 includes a seemingly random combination of five different instances of the items of confidential information. For example, "johngeicocorvallisculver23" is formed by appending five separate items of confidential information together: "JOHN," "GEICO," "CORVALLIS," "CULVER," and "23." Similarly, the next instance of the semirandom permutations of multiple items of confidential information 280, "2018progressivealicestanforddeveloper" is formed by appending five separate items of confidential information together: "2018," "PROGRESSIVE," "ALICE," "STANFORD," and "DEVELOPER." The third instance of the semirandom permutations of multiple items of confidential information 280 is formed in a parallel manner.

FIG. 4 further illustrates how programmed heuristic 124 may essentially randomize the order of the multiple items of confidential information 280 that are used as inputs, or seed characters, when generating multiple candidate passwords 260. In other words, programmed heuristic 124 may essentially pick a random, or pseudorandom, instance from multiple items of confidential information 280 to form the first portion of an instance of multiple candidate passwords 260, and then pick another random or pseudorandom instance from the multiple items of confidential information 280 (e.g., optionally excluding the first selected instance of the multiple items of confidential information 280) to form the next portion of the instance of multiple candidate passwords 260, and so on, in a nested, looped, or repeating fashion. To achieve essentially the same outcome, programmed heuristic 124 may select a smaller subset of multiple items of confidential information 280. Subsequently, programmed heuristic 124 may further establish a random or semirandom order of the selected smaller subset of multiple items of confidential information 280, and then append the members of the smaller subset of multiple items of confidential information 280 together (or otherwise combine the members) in the established random or semirandom order.

Although each of the multiple candidate passwords 260 shown in FIG. 4 is formed by combining, or appending, the same number of underlying items of confidential information together (i.e., five different items of underlying confidential information), this example is merely illustrative and in other examples the different instances of multiple candidate passwords 260 may be formed by combining, or appending, different or varying numbers of underlying items of confidential information together. For example, one of the multiple candidate passwords 260 may be formed by appending together six separate items of underlying confidential information whereas another one of the multiple candidate passwords 260 may be formed by appending together four separate items of underlying confidential information. In general, any suitable number of underlying items of confidential information greater than one may be used to form any one or more of multiple candidate passwords 260.

Figure 6:
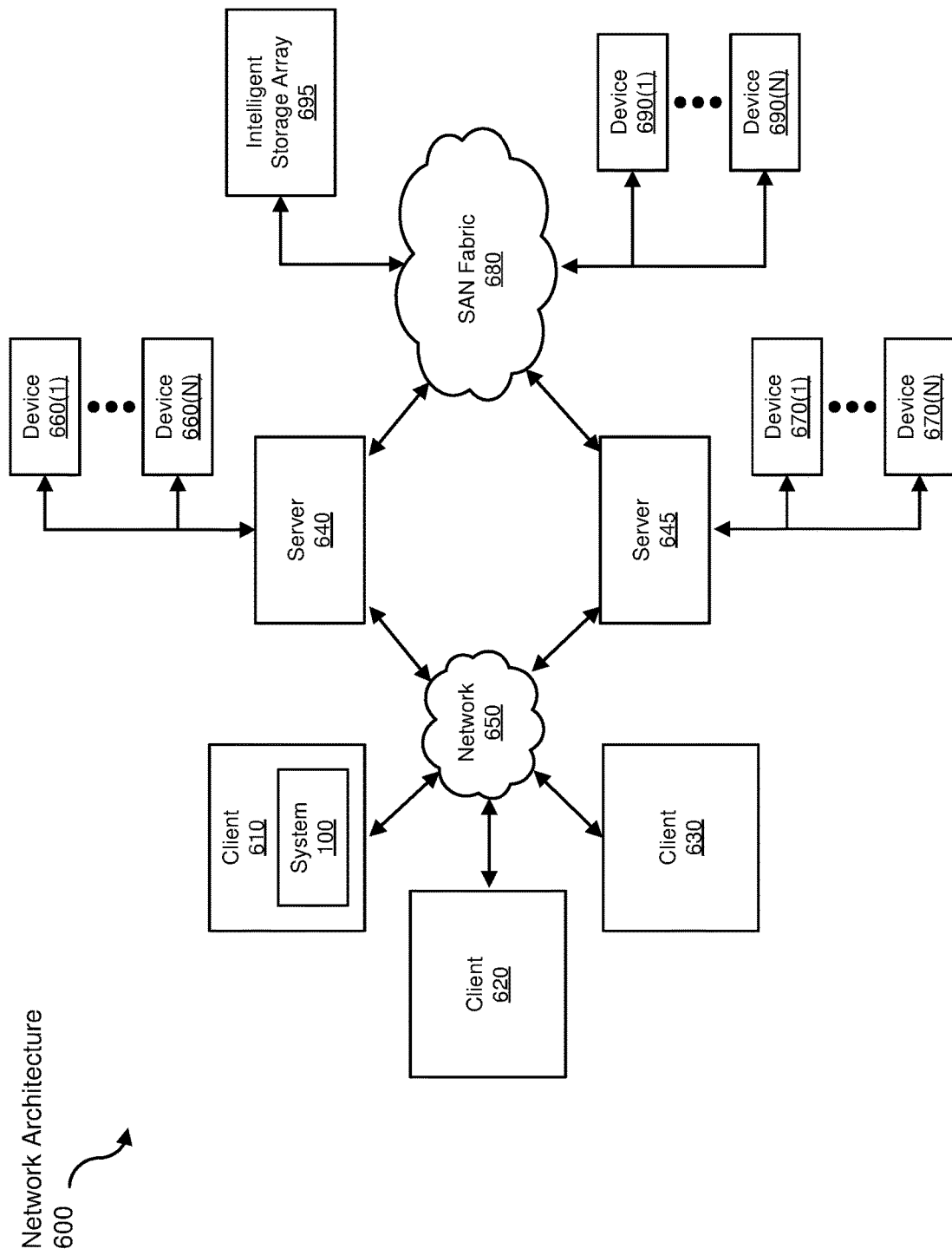
FIG. 6 is a block diagram of an example computing network capable of implementing one or more of the embodiments described and/or illustrated herein.

Additionally, the example of multiple candidate passwords 260 is "pure" in the sense that the three examples of multiple candidate passwords 260 shown in FIG. 6 are formed purely by appending together multiple instances of items of confidential information 280. In these examples, the multiple candidate passwords are derived from the multiple items of confidential information 280 by directly combining the multiple items of confidential information 280. In other examples, the multiple candidate passwords may be "impure" in the sense that they are derived from, or based on, two or more items of confidential information 280 while also being derived from, or based on, one or more other items of information that thereby created deviation from the otherwise "pure" form shown in FIG. 4. For example, an "impure" form of "johngeicocorvallisculver23" may be "johnobamageicocorvallisculver23," because "johnobamageicocorvallisculver23," has the string of characters "obama" (referring to the U.S. President Obama) inserted into the combination of items of information that are otherwise confidential. This specific example illustrates how multiple candidate passwords 260 may, in some cases, be based on a combination permutation of both confidential items of information and also public or non-confidential items of information. In the specific example, the candidate password "johnobamageicocorvallisculver23" is still derived from multiple items of confidential information 280, in accordance with step 306 of method 300, because the specific candidate password is still based upon, or still derived from, a combination of the multiple items of confidential information 280 shown in FIG. 4.

In some examples, execution module 108 may derive the multiple candidate passwords from the respective semirandom permutation of the multiple items of confidential information describing the user in a manner that increases a memorability of the multiple candidate passwords in comparison to candidate passwords that do not describe the user. For example, in the illustrative case of FIG. 4, the multiple candidate passwords "johngeicocorvallisculver23," "2018progressivealicestanforddeveloper," and "corporatechasesymantecjohnalice" may have an increased level of memorability to the user, because each item of underlying confidential information that forms the basis for each of these candidate passwords describes an attribute directly or indirectly relating to the user. In contrast, a random combination of items of information, such as the combination "australiaferrariprinter" or "swedenmoonarchery," would have a comparatively lower level of memorability assuming that the user has no direct or indirect relationship to the key terms from which these candidate passwords are composed (i.e., no direct or indirect relationship to Australia, Ferrari, printers, Sweden, the moon, or archery).

Furthermore, in some examples, execution module 108 may base the multiple candidate passwords on confidential information rather than public information in a manner that increases a strength of the selected specific password. For example, the candidate password "2018progressivealicestanforddeveloper" as a relatively greater strength, as a password, then an alternative candidate password formed of public items of information, such as an alternative candidate password that is formed of a multitude of items of information describing the user that have been extracted from public sources on the Internet. Presumably, the items of information that form the basis of the candidate password "2018progressivealicestanforddeveloper" are not publicly available on the Internet or elsewhere and, therefore, an attacker would not readily have access to these items of information, which may thereby increase the difficulty when attempting to crack or compromise this specific candidate password.

Moreover, in additional examples, execution module 108 may execute the programmed heuristic on the set of multiple items of confidential information to generate multiple candidate passwords at least in part by testing items in an initial larger set of multiple candidate passwords for password strength. For example, in addition to the three instances of multiple candidate passwords 260 shown in FIG. 4, programmed heuristic 124 may also generate another candidate password, "201823," which is formed by combining the two different instances of confidential information corresponding to the end of the Social Security number for the user and the ending of the driver license for the user. Nevertheless, programmed heuristic 124 may further determined that this alternative candidate password, "201823," does not satisfy a threshold level of password strength, which may be evaluated using any suitable heuristic or evaluation password strength based on one or more underlying factors, such as a measurement of the candidate password length, a measurement of the candidate password complexity, a measurement of the candidate password randomness, and/or a measurement of the candidate password prevalence of similarity to other items of information that are publicly known or accessible. In these examples, execution module 108 may optionally filter a subset of the initial larger set of multiple candidate passwords from the initial larger set of multiple candidate passwords based on the subset failing the test for password strength. In the specific examples that are outlined above, execution module 108 may optionally filter the subject formed of the alternative candidate password "201823" from the initial larger set of multiple candidate passwords that include both "201823" and the three different instances of multiple candidate passwords 260 shown in FIG. 4, thereby leaving only the remainder of multiple candidate passwords 260 shown in FIG. 4.

Furthermore, in some examples, execution module 108 may execute the programmed heuristic on the set of multiple items of confidential information by checking whether each item in the set of multiple items of confidential information has been publicly revealed. In the example of FIG. 4, execution module 108 may check whether the name of the user's mother (i.e., "ALICE") has already been publicly revealed. Accordingly, execution module 108 may search the Internet, and/or other publicly available repositories of information, to verify whether the name of the user's mother has already been publicly revealed. Moreover, in these examples, execution module 108 may optionally filter the specific item of seemingly confidential information from an initial or larger set of candidate items of confidential information, based on a determination that the item of information has already been publicly revealed. For example, execution module 108 may filter the item of seemingly confidential information "ALICE" from multiple items of confidential information 280 based on a determination that the name of the user's mother has already been publicly revealed. By filtering the specific item of seemingly confidential information, execution module 108 may thereby assure that the remaining set of items of confidential information, such as the multiple items of confidential information 280 shown in FIG. 4, are actually confidential and have not been publicly revealed.

At step 308, one or more of the systems described herein may display electronically the multiple candidate passwords to the user to enable the user to select a password from the multiple candidate passwords as a specific password for accessing a protected computing resource. For example, displaying module 110 may, as part of computing device 202 in FIG. 2, display electronically the multiple candidate passwords to the user to enable the user to select a password from the multiple candidate passwords as a specific password for accessing a protected computing resource.

Displaying module 110 may display the multiple candidate passwords to the user in a variety of ways. In some example, displaying module 110 may display the multiple candidate passwords to the user in response to receiving one or more of the multiple candidate passwords from server 206. Furthermore, in some examples, displaying module 110 may display the multiple candidate passwords to the user simultaneously. In other examples, displaying module 110 may display the multiple candidate passwords to the user in a serial manner rather than simultaneously. In general, displaying module 110 may display the multiple candidate passwords to the user as the completion of a process initiated by the user to generate the multiple candidate passwords in accordance with method 300. Furthermore, displaying module 110 may optionally request from the user, or prompt the user to provide, a selection of one or more of the multiple candidate passwords to establish as the specific password used to protect the computing resource of step 308. Illustrative examples of the protected computing resource may include a hardware, firmware, virtual, and/or software computing resource, including data, accounts, files, directories, storage devices, profiles, etc.

In further examples, after the completion of method 300, displaying module 110 and/or another security module within system 100 may further protect the computing resource by prompting the user to demonstrate possession of the specific password of step 308 in order to access the computing resource. Subsequently, displaying module 110 and/or the other security module may verify whether the user successfully entered the specific password. Displaying module 110 and/or the other security module may then conditionally authorize and enable the user to access the protected computing resource in response to determining that the user successfully entered the specific password or, alternatively, conditionally exclude the user from accessing the protected computing resource in response to determining that the user failed to enter the specific password.

As further discussed above, the disclosed subject matter may improve upon related password generation systems by generating passwords that are both relatively easy to remember while simultaneously being difficult to crack due to the passwords being based on, or derived from, confidential information rather than being based on information that is merely random or publicly accessible. Accordingly, the disclosed subject matter may enable a user to select a password that has a high level of memorability while also providing a level of safety or assurance to the user that the password will not be cracked by an attacker scanning or searching public repositories of information.

Figure 5:
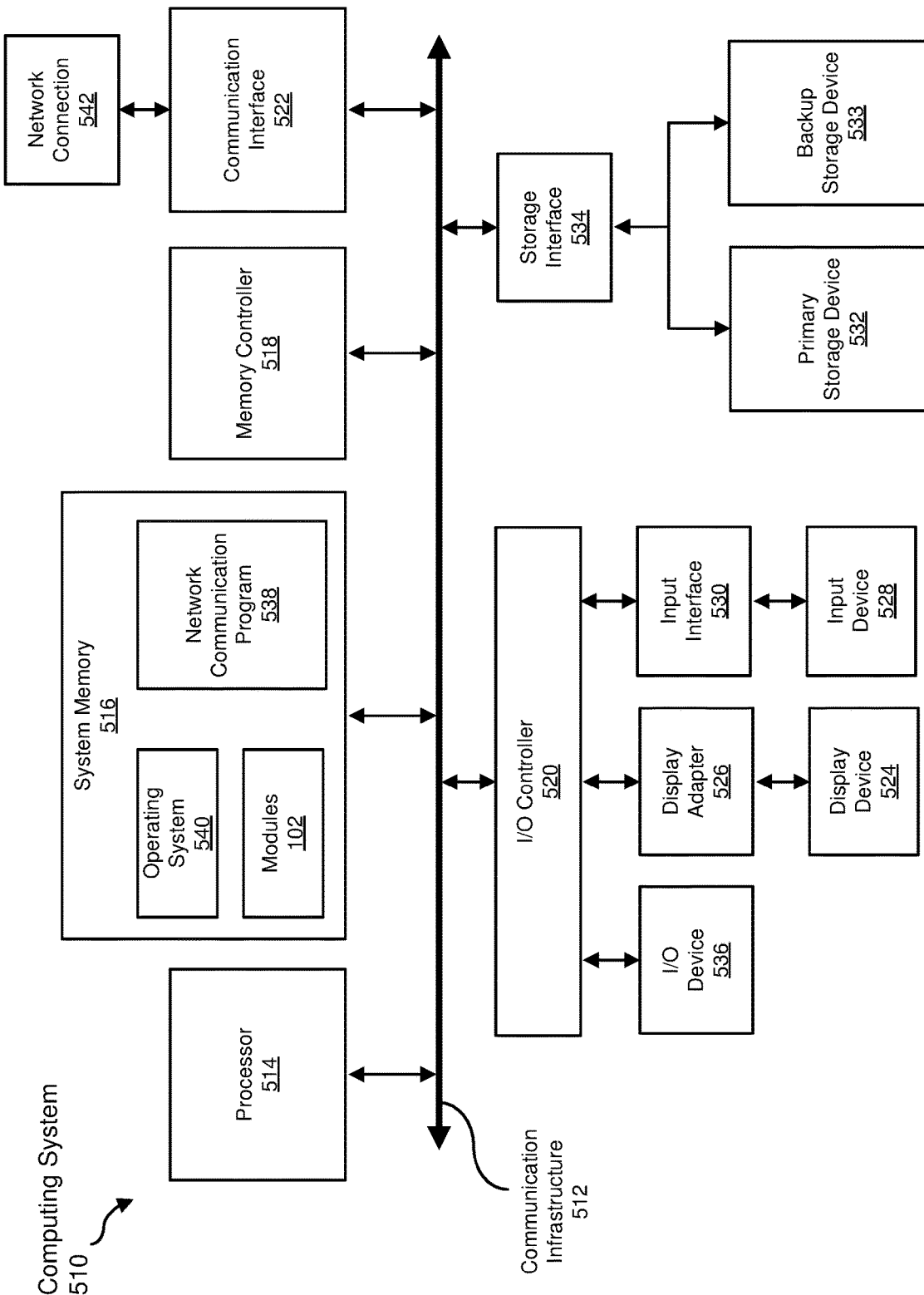
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for generating passwords.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for generating passwords, at least a portion of the method being performed by a computing device comprising at least one processor, the method comprising:
   accessing a vault of confidential information describing a user;
   extracting, from the vault, a set of multiple items of confidential information describing the user;
   executing a programmed heuristic on the set of multiple items of confidential information to generate multiple candidate passwords that each derives from a respective semirandom permutation of the multiple items of confidential information; and
   displaying electronically the multiple candidate passwords to the user to enable the user to select a password from the multiple candidate passwords as a specific password for accessing a protected computing resource;
   wherein:
   the multiple candidate passwords respectively comprise different permutations of concatenating the multiple items of confidential information that were extracted from an identity theft prevention service.

2. The computer-implemented method of claim 1, wherein deriving the multiple candidate passwords from the respective semirandom permutation of the multiple items of confidential information describing the user increases a memorability of the multiple candidate passwords in comparison to candidate passwords that do not describe the user.

3. The computer-implemented method of claim 1, wherein basing the multiple candidate passwords on confidential information rather than public information increases a strength of the selected specific password.

4. The computer-implemented method of claim 1, wherein accessing the vault of confidential information describing the user is performed in response to the user granting access to the vault of confidential information.

5. The computer-implemented method of claim 1, wherein the vault of confidential information is maintained by an identity theft protection service.

6. The computer-implemented method of claim 1, wherein executing the programmed heuristic on the set of multiple items of confidential information to generate multiple candidate passwords comprises testing items in an initial larger set of multiple candidate passwords for password strength.

7. The computer-implemented method of claim 6, further comprising filtering a subset of the initial larger set of multiple candidate passwords from the initial larger set of multiple candidate passwords based on the subset failing the test for password strength.

8. The computer-implemented method of claim 1, wherein executing the programmed heuristic on the set of multiple items of confidential information comprises checking whether each item in the set of multiple items of confidential information has been publicly revealed.

9. The computer-implemented method of claim 8, further comprising filtering a subset of the multiple items of confidential information from the multiple items of confidential information based on a determination that the subset has been publicly revealed.

10. The computer-implemented method of claim 1, further comprising performing a security action to protect the protected computing resource based on the selected specific password.

11. A system for generating passwords, the system comprising:
   an accessing module, stored in memory, that accesses a vault of confidential information describing a user;
   an extraction module, stored in memory, that extracts, from the vault, a set of multiple items of confidential information describing the user;
   an execution module, stored in memory, that executes a programmed heuristic on the set of multiple items of confidential information to generate multiple candidate passwords that each derives from a respective semirandom permutation of the multiple items of confidential information;
   a displaying module, stored in memory, that displays electronically the multiple candidate passwords to the user to enable the user to select a password from the multiple candidate passwords as a specific password for accessing a protected computing resource; and
   at least one physical processor configured to execute the accessing module, the extraction module, the execution module, and the displaying module;
   wherein:
   the multiple candidate passwords respectively comprise different permutations of concatenating the multiple items of confidential information that were extracted from an identity theft prevention service.

12. The system of claim 11, wherein the execution module derives the multiple candidate passwords from the respective semirandom permutation of the multiple items of confidential information describing the user such that a memorability of the multiple candidate passwords is increased in comparison to candidate passwords that do not describe the user.

13. The system of claim 11, wherein the execution module bases the multiple candidate passwords on confidential information rather than public information such that a strength of the selected specific password is increased.

14. The system of claim 11, wherein the accessing module accesses the vault of confidential information describing the user in response to the user granting access to the vault of confidential information.

15. The system of claim 11, wherein the vault of confidential information is maintained by an identity theft protection service.

16. The system of claim 11, wherein the execution module executes the programmed heuristic on the set of multiple items of confidential information to generate multiple candidate passwords by testing items in an initial larger set of multiple candidate passwords for password strength.

17. The system of claim 16, wherein the execution module further filters a subset of the initial larger set of multiple candidate passwords from the initial larger set of multiple candidate passwords based on the subset failing the test for password strength.

18. The system of claim 11, wherein the execution module executes the programmed heuristic on the set of multiple items of confidential information by checking whether each item in the set of multiple items of confidential information has been publicly revealed.

19. The system of claim 18, wherein the execution module filters a subset of the multiple items of confidential information from the multiple items of confidential information based on a determination that the subset has been publicly revealed.

20. A non-transitory computer-readable medium comprising one or more computer-readable instructions that, when executed by at least one processor of a computing device, cause the computing device to:
- access a vault of confidential information describing a user;
- extract, from the vault, a set of multiple items of confidential information describing the user;
- execute a programmed heuristic on the set of multiple items of confidential information to generate multiple candidate passwords that each derives from a respective semirandom permutation of the multiple items of confidential information; and
- display electronically the multiple candidate passwords to the user to enable the user to select a password from the multiple candidate passwords as a specific password for accessing a protected computing resource;

wherein:
the multiple candidate passwords respectively comprise different permutations of concatenating the multiple items of confidential information that were extracted from an identity theft prevention service.

* * * * *